US005916668A

United States Patent [19]

Long et al.

[11] Patent Number: 5,916,668

[45] Date of Patent: Jun. 29, 1999

[54] SUNSHIELD FILM TRANSPARENT TO RADIO FREQUENCY ENERGY AND SHIELDED ARTICLES

[75] Inventors: Lynn E. Long, Manhattan Beach; Frank D. Hironaka, Redondo Beach, both of Calif.

[73] Assignee: Hughes Electronics Corporation, El Segundo, Calif.

[21] Appl. No.: 08/577,983

[22] Filed: Dec. 22, 1995

[51] Int. Cl.[6] .............................. B32B 27/28; H01Q 1/27

[52] U.S. Cl. .......................... 428/215; 428/216; 428/447; 428/473.5; 343/872; 343/873; 343/846

[58] Field of Search .................................... 428/447, 212, 428/213, 216, 473.5, 215; 343/873, 846, 872, 885

[56] References Cited

U.S. PATENT DOCUMENTS

| | | | |
|---|---|---|---|
| 4,705,646 | 11/1987 | DuPont et al. | 252/511 |
| 5,082,596 | 1/1992 | Fukuda et al. | 252/511 |
| 5,094,693 | 3/1992 | Cordaro et al. | 106/425 |
| 5,215,824 | 6/1993 | Murno, III et al. | 428/473.5 |
| 5,589,274 | 12/1996 | Long et al. | 428/215 |
| 5,665,274 | 9/1997 | Long et al. | 252/511 |

FOREIGN PATENT DOCUMENTS

| | | |
|---|---|---|
| 0 184 945 | 6/1986 | European Pat. Off. . |
| 0 681 911 A1 | 11/1995 | European Pat. Off. . |
| 2 277 200 | 10/1994 | United Kingdom . |

OTHER PUBLICATIONS

Cordaro, J., et al.; "Molecular Engineering of Pigments for Degradation–Resistant Thermal Control Coatings"; AAIA Reprint, AIAA Materials Specialist Conference; Apr. 16–17, 1992.

*Primary Examiner*—Paul Thibodeau
*Assistant Examiner*—D. Lawrence Tarazano
*Attorney, Agent, or Firm*—Georgann S. Grunebach; M. W. Sales

[57] ABSTRACT

A structure protected by a sunshield film includes an article, for example a spacecraft radio-frequency antenna, and a sunshield film protecting the article surface. The sunshield film is formed as a sheet substrate made of a material that is transparent to radio frequency energy, a white coating on one side of the sheet substrate, and a black coating on the other side of the sheet substrate. The white coating and the black coating each have a surface resistivity of from about $10^8$ to about $10^9$ ohms per square.

11 Claims, 2 Drawing Sheets

SUNSHIELD FILM TRANSPARENT TO RADIO FREQUENCY ENERGY AND SHIELDED ARTICLES

BACKGROUND OF THE INVENTION

This invention relates to the shielding of articles in a space environment, and, more particularly, to shielding that provides thermal and electrical control while being transparent to radio-frequency energy.

A structure in space is subjected to severe conditions of heating and cooling, buildup of electrical charges, external radiation and particle attack, and passive intermodulation (PIM). These factors are all related to surface properties of the structure. The surface properties of materials that make good structures may not be optimal in regard to these other considerations. Consequently, it is known to provide some of the external surfaces of the structures with protective structures, generically termed "sunshields", that protect them from external attack and also provide positive effects including the dissipation of static charge and passive thermal control. The sunshield also must be readily affixed to the structure to be protected, yet durable. In the case of some spacecraft, such as communications satellites, the structure must remain stable and resist degradation for a period of years.

A radio frequency or radar antenna structure of a spacecraft is subject to all of these considerations. In addition, any protective structure for the antenna must be transparent to the transmission of radio frequency (RF) energy to and from the antenna. (As used herein, "antenna" includes both the transmitting/receiving element and the related structure, such as its feedhorns.) This additional requirement of RF transparency imposes a significant constraint on the sunshield, because, to some extent, the ability to prevent the buildup of electrical static charge and RF transparency are apparently incompatible. Ideally, the sunshield would be electrically conductive to bleed static charges, but a dielectric to be RF transparent.

Several approaches are known in an attempt to satisfy the shielding requirements for spacecraft antennas. In one, a polyimide film has a thin layer of germanium on one side and a thin layer of gridded vacuum-deposited aluminum on the other. This material is RF transparent, but it does not meet electrostatic discharge requirements and is a potential source for passive intermodulation problems because of the presence of the aluminum metal. In another approach, the Spar sunshield material is formed of a thick sheet of polyimide film with a white dielectric paint on one side and a black dielectric paint on the other side. Neither paint dissipates static charges, so the white-paint side is typically overcoated with a thin film of indium-tin-oxide (ITO) in an attempt to control static charges. This film material meets RF-transparency, thermal, and PIM requirements, but testing has shown that it is subject to the accumulation of excessive static charges. If the ITO coating is made sufficiently thick to dissipate static charges in a satisfactory manner, it tends to block the transmission of RF signals.

There is a need for an improved sunshield material for spacecraft RF antennas and other structures that must meet the various requirements just discussed. The present invention fulfills this need, and further provides related advantages.

SUMMARY OF THE INVENTION

The present invention provides a sunshield film and articles protected by the sunshield film, which is most advantageously utilized with spacecraft antennas. The sunshield film of the invention dissipates static charge yet is transparent to radio-frequency (RF) energy so that it is suitable for the protection of antennas and other structures that must transmit and/or receive RF energy. The sunshield film also aids in thermal control at the surface of the structure and meets passive intermodulation requirements. The sunshield film is readily applied, meets spacecraft materials requirements such as outgassing limitations, and is durable in a space environment over extended periods of time.

In accordance with the invention, a sunshield film comprises a sheet substrate made of a material that is transparent to radio frequency energy, a white coating on a first side of the sheet substrate, and a black coating on the second side of the sheet substrate. The white coating and the black coating each have a surface resistivity of from about $10^8$ to about $10^9$ ohms per square. This surface resistivity is selected to provide a sufficiently low surface resistivity to dissipate static charge but a sufficiently high surface resistivity to be transparent to radio frequency energy.

The sheet substrate is preferably a polymeric material such as a polyimide sheet, from about 0.001 inch to about 0.003 inch thick. The coatings are each preferably in the form of a paint that is conveniently applied to the sheet substrate by a technique such as spraying. The white coating is preferably a silicone polymeric matrix having doped zinc oxide pigment particles distributed therein, where the zinc oxide pigment particles are doped with an element that forms shallow donorlike states in the zinc oxide. The white coating is preferably about 0.004 inch to about 0.006 inch. The black coating is preferably a silicone polymeric matrix having carbon pigment particles distributed therein, with a thickness of from about 0.001 inch to about 0.002 inch.

This sunshield film is stable in a space environment. Its most preferred use is on spacecraft structural components that transmit or receive radio-frequency energy. An example of such a use is a spacecraft radio-frequency antenna.

The present approach provides a sunshield film structure that meets spacecraft static charge dissipation, thermal control, passive intermodulation, application, and longevity requirements, and is also transparent to RF energy. This sunshield film structure is relatively inexpensive as compared with other protective films intended to achieve the same objectives, as it involves the formulation and application of paints rather than vacuum deposition and other types of more-complex fabrication procedures. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
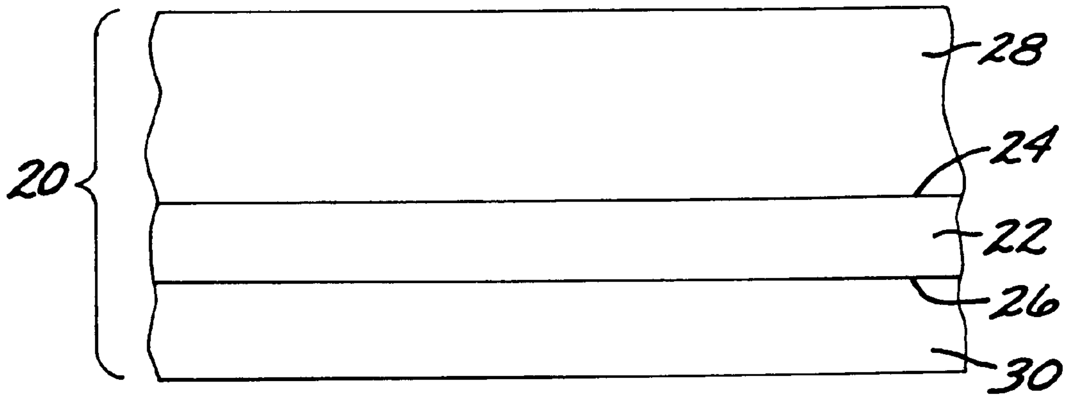
FIG. 1 is a schematic sectional view of a sunshield film according to the invention.

FIG. 1 depicts a sunshield film 20 according to the invention. The sunshield film 20 includes a sheet substrate 22 made of a material that is transparent to radio frequency energy. (As used herein, "transparent" means that energy experiences substantially no attenuation as it passes through a component. It is recognized and accepted that there will be some negligible, but acceptably small, attenuation.) A preferred material of construction of the sheet substrate 22 is a polymeric material, most preferably a polyimide sheet. The sheet substrate is preferably from about 0.001 inch to about 0.003 inch thick, most preferably about 0.002 inch thick. Polyimide sheet about 0.002 inch thick is available commercially as DuPont Kapton™ polyimide sheet. Such a sheet substrate is known to be stable to physical and chemical degradation in a space environment, is readily coated in the present approach, and is flexible for conforming to the surface of an article to be coated. The thickness of the sheet substrate 22 is selected to be sufficiently thick to withstand the fabrication and coating operations, yet sufficiently thin to conform to surface shapes and not add unnecessary weight or RF attenuation. The sheet substrate has a first side 24 and a second side 26.

A white coating 28 overlies and is in contact with the first side 24. The white coating 28 comprises a silicone polymeric matrix having doped zinc oxide pigment particles distributed therein. The zinc oxide pigment particles are doped with an element that forms shallow donorlike states in the zinc oxide. Zinc oxide particles have a white color and impart that color to the coating. It is known that the doping of the particles with elements that form shallow donorlike states aids in retaining the white color following exposure to radiation in space and also imparts sufficient electrical conductivity to allow the coating to dissipate electrostatic charges. See J. Cordaro et al., "Molecular Engineering of Pigments for Degradation-Resistant Thermal Control Coatings," AIAA Reprint AIAA-92-2167 of Presentation at AIAA Materials Specialist Conference on Coating Technology for Aerospace Systems, Apr. 16–17, 1992.

The preferred dopant for the zinc oxide particles is aluminum, but boron, gallium, indium, zinc, tin, and/or hydrogen may also be used. In the most preferred case, the zinc oxide is doped with from about 0.35 to about 1.0 weight percent aluminum and has a particle size of about 25 micrometers. This dopant level produces the required surface resistivity of from about $10^8$ to about $10^9$ ohms per square. The small particle size aids in achieving a smooth consistency to the coating material in a solvent, before the coating is dried. The most preferred doped pigment material is available commercially from Union Miniere of Belgium.

The silicone polymer matrix is preferably cross-linked and polymerized dimethyl silicone copolymer, which is flexible and resistant to degradation in ultraviolet (UV) light. The silicone polymer exhibits a good degree of deformability without cracking, both when the doped zinc oxide pigment is present at moderate levels and when it is not present. This deformability permits the final coating to deform during the bending of the sheet substrate 22. The deformability of the coating also improves the resistance of the coating to cracking as a result of handling, installation, impacts and the like during service. Other flexible polymer materials may be used for the matrix, such as silicone-modified epoxy or polyurethane materials. However, experience has shown that the dimethyl silicone copolymer has the highest resistance to UV degradation, and it is therefore preferred.

The ratio of doped zinc oxide pigment preferably ranges from about 3 to about 4 parts by weight, per 1 part by weight of the dimethyl silicone polymer matrix. The white coating may have a composition outside this range, but the performance of such a coating is not as good as that of coatings within the range. If the weight ratio of pigment to polymer is less than about 3-to-1, the solar absorptance of the coating is greater than preferred. If the weight ratio of pigment to polymer is greater than about 4-to-1, there is insufficient polymer to bind the pigment together in a coherent coating. The result in the latter case is a coating having reduced physical integrity, strength, and resistance to fracture.

The white coating 28 is preferably from about 0.004 inches to about 0.006 inches thick. If the white coating is thinner than about 0.004 inches, it does not meet electrostatic discharge requirements because it does not have sufficient surface conductivity to dissipate electrical charges. A thicker coating serves no purpose, and adds weight and attenuation effects.

A black coating 30 overlies and is in contact with the second side 26. The black coating preferably comprises a silicone polymeric matrix having electrically conductive carbon particles distributed therethrough. The carbon particles have a black color and impart that color to the coating. The carbon particles are electrically conductive and impart sufficient electrical conductivity to allow the coating to dissipate electrostatic charges.

The silicone polymer matrix is preferably a methyl phenyl silicone polymer, which is flexible and resistant to degradation in ultraviolet (UV) light. The silicone polymer exhibits a good degree of deformability without cracking, both when the doped zinc oxide pigment is present at moderate levels and when it is not present. This deformability permits the final coating to deform during the bending of the sheet substrate 22. The deformability of the coating also improves the resistance of the coating to cracking as a result of impacts and the like during service. Other flexible polymer materials may be used for the matrix, such as silicone-modified epoxy or polyurethane materials. However, experience has shown that the dimethyl silicone copolymer has the highest resistance to UV degradation, and it is therefore preferred.

The ratio of carbon pigment particles to polymer matrix preferably ranges from about 1.25 to about 1.5 parts by weight per 100 parts by weight of the methyl phenyl silicone polymer matrix. It is permissible to use a black coating outside these ranges, but the performance of such coatings is not as good as that of coatings within the range. If the weight ratio of carbon pigment to polymer is less than about 1.25:100, the resistivity of the coating is too high. If the weight ratio of carbon pigment to polymer is greater than about 1.5:100, the resistivity of the coating is too low.

The black coating 30 is preferably from about 0.001 inches to about 0.002 inches thick. If the coating is thinner than about 0.001 inches, there is a risk of pinholes during application and the coating may not have sufficient surface conductivity to dissipate electrical charges. A thicker coating serves no purpose, adds weight, and unnecessarily attenuates RF energy passing therethrough.

In a most preferred embodiment, the polyimide film is from about 0.001 to about 0.003 inches thick. The white coating has a composition and thickness as described above, with a resulting surface resistivity of from about $10^8$ to about $10^9$ ohms per square. The black coating has a composition and thickness as described above, also with a surface resistivity of from about $10^8$ to about $10^9$ ohms per square.

Figure 2:
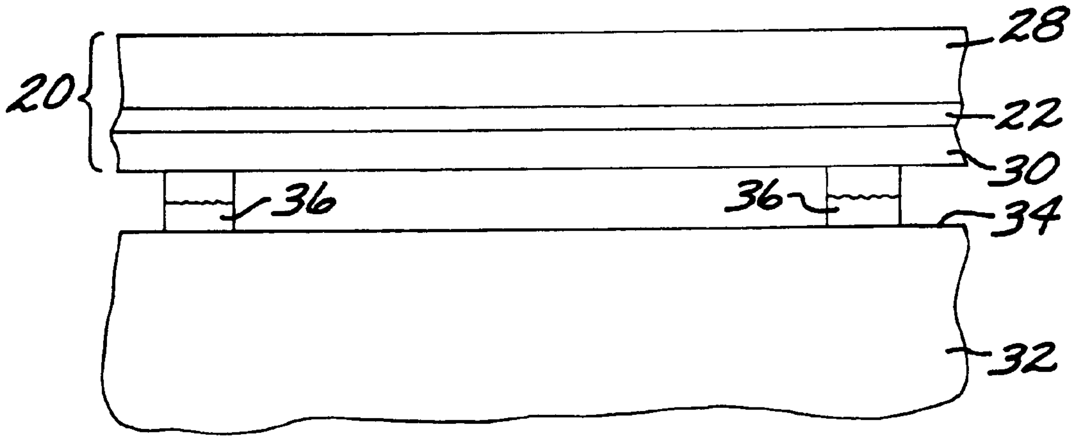
FIG. 2 is a schematic sectional view of an article protected by the sunshield film of the invention.

FIG. 2 illustrates a structure comprising an article 32 having the sunshield film 20 applied thereto. The sunshield film 20 is supported above a surface 34 of the article 32 by appropriate standoff support fasteners 36. Most preferably, the support fasteners 36 are hook-and-loop fasteners (such as velcro fasteners) with the hook side attached to one of the film 20 and the surface 34, and the loop side fastened to the other of the film 20 and the surface 34. In this structure, the white coating 28 of the sunshield film 20 faces outwardly away from the article 32, to provide a low solar absorptive surface. The black coating 30 of the sunshield film 20 faces inwardly toward the article 32, to provide a high emittance surface.

The article 32 may be any article. Most preferably, the article 32 is a spacecraft component that transmits and/or receives radio frequency energy. The preferred article 32 is a spacecraft antenna (which term as used herein includes related structure such as the feedhorn).

Figure 3:
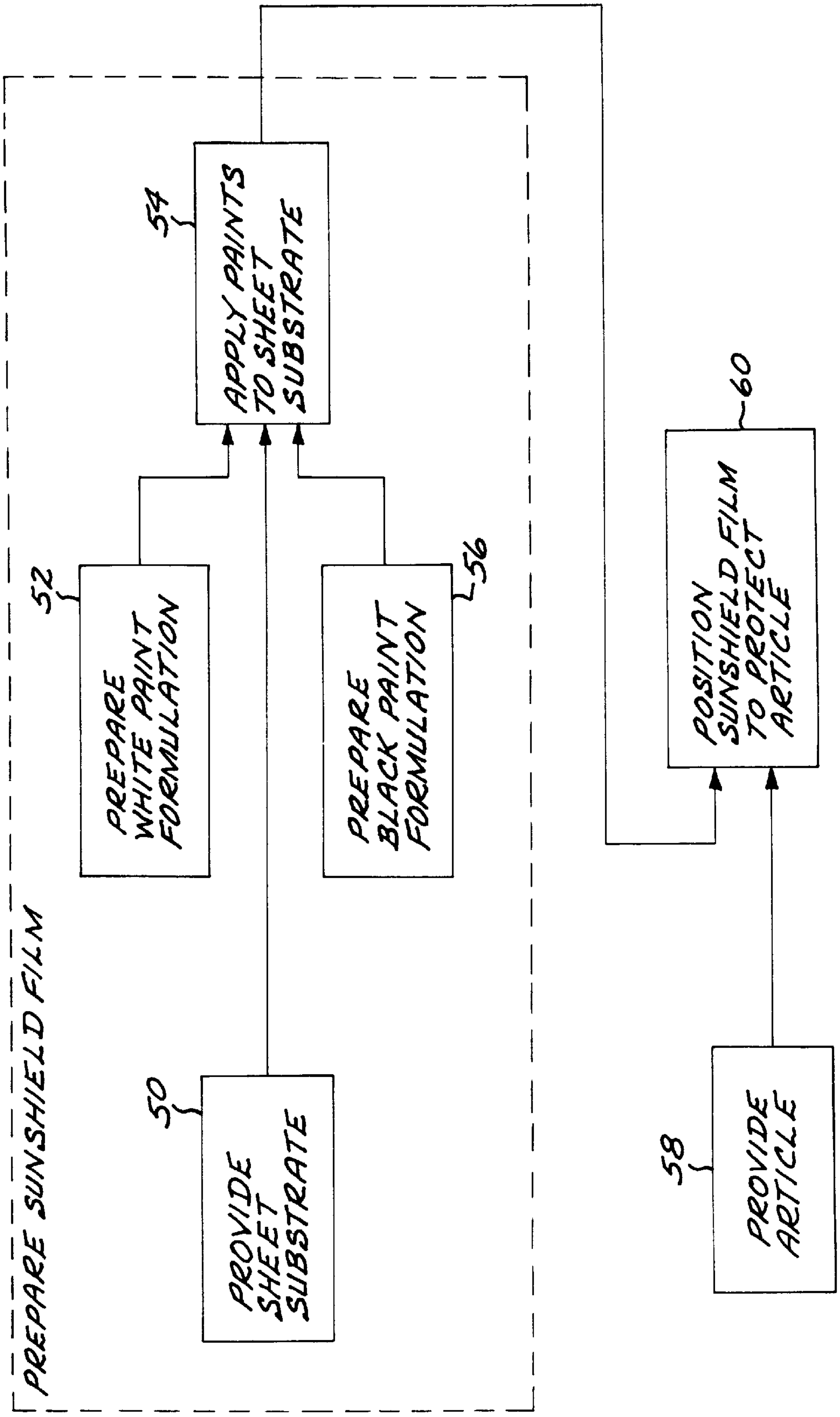
FIG. 3 is a block flow diagram of an approach used in the preparation of the sunshield film and its application to an article.

FIG. 3 depicts a preferred method of preparing the structure comprising an article 32 having the sunshield film 20 applied thereto. The preferred materials of construction are those described previously hereinabove. The sheet substrate is provided, numeral 50.

The white coating 28 formulation is prepared as a paint, numeral 52. To prepare the paint, a mixture of a silicone polymer precursor, the doped zinc oxide particles, and a solvent is prepared. The silicone polymer precursor is a compound that is polymerized and cross-linked to produce the silicone polymer material of the matrix. In the preferred case, the precursor is dimethyl silicone copolymer. The liquid copolymer is available commercially from NuSil Technology. The copolymer is dissolved in an appropriate solvent, in the preferred case VM&P (varnish makers and painters) naphtha solvent. The silicone polymer precursor, the solvent, and the doped zinc oxide particles are mixed together. In a preferred case, 100 parts by weight of dimethyl silicone copolymer, 312 parts by weight of VM&P naphtha solvent, and from 300 to 400 parts by weight of the aluminum-doped zinc oxide pigment are combined to form a precursor mixture and placed into a ceramic jar with ½ inch diameter ceramic grinding media. The jar is closed and placed onto a ball mill. Ball milling is continued for typically about 3 hours, until the pigment is ground to a Hegman grind of at least 6. After ball mill grinding is complete, the precursor mixture is transferred to a glass or metal container.

A cross-linking agent and a catalyst are added to the precursor mixture. The cross-linking agent and the catalyst are those indicated by the manufacturer as appropriate for the selected polymeric precursor. In the preferred approach, about 7.5 parts of 90 percent Silbond TNPS cross-linking agent and about 0.75 parts by weight of dibutyltin dilaurate catalyst are added to the precursor mixture, yielding a final mixture. The cross-linking agent increases the cross-linking density of the cured coating and makes the coating tougher. The catalyst accelerates the cross-linking process. The cross-linking agent can be added at any time prior to coating, but the catalyst is added immediately prior to application of the final mixture to the surface. An earlier addition of the catalyst would result in an overly thick consistency of the mixture for coating, which consistency could not be reduced through the addition of additional solvent. Additional VM&P naphtha or xylene solvent may be added at this time to adjust the consistency of the final mixture according to the application procedure that has been selected, ambient temperature, and other conditions. For the preferred spraying application procedure, about 65 to 130 additional parts by weight of VM&P naphtha or xylene solvent are added to reduce the viscosity of the final mixture.

The final white paint formulation mixture is applied to the first side 24 of the substrate 22, numeral 54. The first side 24 of the sheet substrate 22 is cleaned of dirt, grease, and other foreign matter by wiping with a solvent. In most cases, the first side 24 is primed to improve the adherence of the mixture before the mixture is applied. Standard primers for polymeric application are available. The preferred primer is A1100 silane primer (available from Union Carbide). The primer is applied in the manner recommended by its supplier. For the preferred primer, application is by spray gun with subsequent drying for one hour before the final mixture is applied. The layer of silane adhesion promoter is from about 0.0001 to about 0.0002 inches thick.

Application of the final mixture can be accomplished by any operable technique, such as, for example, spraying, painting, dipping, etc. The amount of solvent in the final mixture is selected to be compatible with the selected application technique. The above-described formulation of the final mixture is for the preferred application approach of spraying. To accomplish the spray application, any conventional air-atomizing sprayer and its conventional spray procedure are used.

With the formulation discussed above, the spraying produces a uniform coating on the first side 24. The coating can be relatively thicker or thinner, within the limitations discussed previously. As in conventional painting, however, if a thicker coating is desired it is preferred to apply a succession of thinner coats over an area and to allow each thin coat to dry partially before applying the next coat. The mixture applied to the surface is permitted to dry. After the complete coating has been applied, it is preferred to permit the coating to dry for at least 7 days in ambient air prior to use.

The black coating 30 formulation is prepared as a paint, numeral 56. To prepare the paint, a mixture of a silicone polymer or polymer precursor, the carbon particles, and a solvent is prepared. The silicone polymer precursor, where used, is a compound that can be polymerized and cross-linked to result in the silicone polymer material of the matrix. In the preferred case, the methyl phenyl silicone polymer, available commercially from NuSil Technology, is used. The polymer is dissolved in an appropriate solvent, in the preferred case VM&P (varnish makers and painters) naphtha solvent. The silicone polymer, the solvent, and the carbon particles are mixed together. In a preferred case, 100 parts by weight of silicone polymer, 50 parts by weight of VM&P naphtha solvent, and 1.35 parts by weight of the carbon particles are combined to form a precursor mixture and placed into a ceramic jar with ½ inch diameter ceramic grinding media. The jar is closed and placed onto a ball mill. Ball milling is continued for typically about 3–4 hours, until the pigment is ground to a Hegman grind of at least 7. If necessary, the ball mill grinding is continued until the desired grind size is reached. After ball mill grinding is complete, the precursor mixture is transferred to a glass or metal container.

The paint formulation is applied to the second side 26 of the sheet substrate 22, numeral 54. The second side 26 of the sheet substrate 22 is cleaned of dirt, grease, and other foreign matter by wiping with a solvent. No other special preparation of the surface, such as etching, priming, or the like, is required, nor is a cross-linking agent or a catalyst added to the mixture. Additional solvent may be added at this time to adjust the consistency of the final mixture according to the application procedure that has been selected, ambient temperature, and other conditions. For the preferred spraying application procedure, about 65 to 130 additional parts by weight of VM&P naphtha or xylene solvent is added to reduce the viscosity of the final mixture. The final mixture is applied to the second side 26 of the substrate 22.

Application of the final mixture can be accomplished by any operable technique, such as, for example, spraying, painting, dipping, etc. The amount of solvent in the final mixture is selected to be compatible with the selected application technique. The above-described formulation of the final mixture is for the preferred application approach of spraying. To accomplish the spray application, any conventional air-atomizing sprayer and its conventional spray procedure are used.

With the formulation discussed above, the spraying produces a uniform coating on the second side 26. The coating can be relatively thicker or thinner, within the limitations discussed previously. As with conventional painting, however, if a thicker coating is desired it is preferred to apply a succession of thinner coats over an area and to allow each thin coat to dry partially before applying the next coat. The mixture applied to the surface is permitted to dry. After the complete coating has been applied, it is preferred to permit the coating to dry for at least 7 days in ambient air prior to use. In practice, both the white coating and the black coating are applied consecutively, the first one applied being allowed to dry sufficiently that it does not run, and then the coated sheet substrate is allowed to dry for at least 7 days.

The application and drying of the black and white paints to the sheet substrate completes the preparation of the sunshield film 20. This film is a free-standing material that exists apart from its application to the article 32. It may be used immediately or stored prior to its application to the article.

The article 32 to be protected is provided, numeral 58. As discussed, the article 32 is preferably a spacecraft component that is required to transmit or receive radio frequency energy during service, such as a radio, microwave, or radar antenna (including its related structure such as a feedhorn). The sunshield film 20 is positioned over the surface 34 of the article 32, numeral 60. Any operable means of positioning may be used. In the preferred approach, a number of hook-and-loop standoff fasteners 36, one side of each fastener bonded to each of the film 20 and the surface 34, are used.

Test specimens of the preferred sunshield film 20 have been prepared according to the approach described above and tested for suitability. The solar absorptance is measured to be 0.21 to 0.24, and the infrared emittance is measured to be 0.88 to 0.90. The film charges to 400–600 volts when exposed to up to a 25 KEV electron flux density during charging testing using an electron beam gun. The film is found to be highly transparent to radio frequency energy and exhibits no passive intermodulation problems.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sunshield film, comprising a sheet substrate made of a material that is transparent to radio frequency energy, the sheet substrate having a first side and a second side;

a white coating on the first side of the sheet substrate, the white coating having a surface resistivity of from about $10^8$ to about $10^9$ ohms per square; and a black coating on the second side of the sheet substrate, the black coating having a surface resistivity of from about $10^8$ to about $10^9$ ohms per square.

2. The sunshield film of claim 1, wherein the sheet substrate is a polymeric material.

3. The sunshield film of claim 1, wherein the sheet substrate is a polyimide.

4. The sunshield film of claim 1, wherein the sheet substrate has a thickness of from about 0.001 inch to about 0.003 inch.

5. The sunshield film of claim 1, wherein the white coating comprises a silicone polymeric matrix having doped zinc oxide pigment particles distributed therein, the zinc oxide pigment particles being doped with an element that forms shallow donorlike states in the zinc oxide.

6. The sunshield film of claim 1, wherein the white coating has a thickness of from about 0.004 inch to about 0.006 inch.

7. The sunshield film of claim 1, wherein the black coating comprises a silicone polymeric matrix having carbon pigment particles distributed therein.

8. The sunshield film of claim 1, wherein the black coating has a thickness of from about 0.001 inch to about 0.002 inch.

9. The sunshield film of claim 1, wherein the sheet substrate is a polyimide having a thickness of from about 0.001 inch to about 0.003 inch, the white coating comprises a silicone polymeric matrix having doped zinc oxide pigment particles distributed therein, the zinc oxide pigment particles being doped with an element that forms shallow donorlike states in the zinc oxide, and wherein the white coating has a thickness of from about 0.004 inch to about 0.006 inch; and the black coating comprises a silicone polymeric matrix having carbon pigment particles distributed therein, and wherein the black coating has a thickness of from about 0.001 inch to about 0.002 inch.

10. The sunshield film of claim 1, wherein the white coating comprises a silicone polymeric matrix having doped zinc oxide pigment particles distributed therein, the zinc oxide pigment particles being doped with an element selected from the group consisting of aluminum, boron, gallium, indium, zinc, tin, and hydrogen.

11. The sunshield film of claim 1, wherein the sheet substrate is a polyimide having a thickness of from about 0.001 inch to about 0.003 inch, the white coating comprises a silicone polymeric matrix having doped zinc oxide pigment particles distributed therein, the zinc oxide pigment particles being doped with an element selected from the group consisting of aluminum, boron, gallium, indium, zinc, tin, and hydrogen, and wherein the white coating has a thickness of from about 0.004 inch to about 0.006 inch; and the black coating comprises a silicone polymeric matrix having carbon pigment particles distributed therein, and wherein the black coating has a thickness of from about 0.001 inch to about 0.002 inch.

* * * * *